(12) United States Patent
Carter (10) Patent No.: US 9,542,399 B2
(45) Date of Patent: Jan. 10, 2017

(54) SYSTEM AND METHOD FOR REMOVABLE DATA STORAGE ELEMENTS PROVIDED AS CLOUD BASED STORAGE SYSTEM

(71) Applicant: Spectra Logic Corporation, Boulder, CO (US)

(72) Inventor: Joshua Daniel Carter, Lafayette, CO (US)

(73) Assignee: Spectra Logic, Corporation, Boulder, CO (US)

( * ) Notice: Subject to any disclaimer, the term of this patent is extended or adjusted under 35 U.S.C. 154(b) by 145 days.

(21) Appl. No.: 13/736,472

(22) Filed: Jan. 8, 2013

(65) Prior Publication Data

US 2014/0195633 A1    Jul. 10, 2014

(51) Int. Cl.
| | | |
|---|---|---|
| G06F 17/30 | (2006.01) | |
| G06F 15/167 | (2006.01) | |
| G06F 13/38 | (2006.01) | |

(52) U.S. Cl.
CPC ....... G06F 17/30073 (2013.01); G06F 17/302 (2013.01); G06F 17/30516 (2013.01)

(58) Field of Classification Search
CPC ...... G06F 12/00; G06F 3/0614; G06F 3/0608; G06F 17/30073; G06F 17/302; G06F 17/30516
USPC ..................... 709/213, 219; 711/108; 710/68
See application file for complete search history.

(56) References Cited

U.S. PATENT DOCUMENTS

| | | | | |
|---|---|---|---|---|
| 7,055,001 | B2* | 5/2006 | Miura | 711/133 |
| 7,062,541 | B1* | 6/2006 | Cannon et al. | 709/219 |
| 7,165,079 | B1* | 1/2007 | Chen et al. | |
| 7,171,626 | B2* | 1/2007 | Sheldon | G06F 3/0481 707/999.2 |
| 7,313,576 | B2* | 12/2007 | Clark et al. | |
| 8,046,509 | B2* | 10/2011 | Bondurant | 710/68 |
| 8,200,923 | B1* | 6/2012 | Healey et al. | 711/162 |
| 2004/0175157 | A1* | 9/2004 | Johnson | 386/125 |
| 2013/0124796 | A1* | 5/2013 | Luo | 711/108 |

FOREIGN PATENT DOCUMENTS

CN          102147711 A    *    8/2011

* cited by examiner

*Primary Examiner* — David Lazaro
*Assistant Examiner* — Zi Ye
(74) *Attorney, Agent, or Firm* — Kenneth Altshuler (57) ABSTRACT

Provided is a system and method for providing removable data storage elements as a cloud based storage system. More specifically, the method achieves this for at least one embodiment by receiving at least one generally random stream of data objects, each data object having at least one identifiable element. The method directs the selection of at least a first identifiable element. The method then orders the stream of data objects against the first identifiable element and disposes the data objects upon at least one of the removable data storage elements in accordance with the ordered stream of data objects. A system for performing the method is also disclosed.

4 Claims, 12 Drawing Sheets

SYSTEM AND METHOD FOR REMOVABLE DATA STORAGE ELEMENTS PROVIDED AS CLOUD BASED STORAGE SYSTEM

CROSS-REFERENCE TO RELATED APPLICATIONS

None.

FIELD OF THE INVENTION

The present invention relates generally to systems and methods for data storage, and more specifically to systems and methods for providing removable data storage elements for a cloud environment.

BACKGROUND

Data processing systems are a staple of digital commerce, both private and commercial. Speed of data processing is important and has been addressed in a variety of different ways. In some instances, greater memory and central processing power are desirable, albeit at increased cost over system or systems with less memory and processing power.

Commerce, and indeed business in general is highly reliant on networked computer systems for nearly all aspects of business activity, such as offering products for sale, maintaining account records, analyzing data, etc. . . . Yet the needs for resources may and often do change from time to time.

Networks exist in a variety of forms, from the vast and expansive nature of the Internet to the small local area network of a company or home setting. Whereas it was once common place to provide all desired computer resources within one physical system, networking systems permit a greater flexibility in adaptively balancing resources and scaling to meet growing demands.

One type of networking resource that has grown in popularity is cloud computing. With respect to cloud storage, a user is permitted a great degree in terms of freedom to add or remove large or small quantities of data without incurring the direct costs of increasing hardware storage to accommodate larger volumes, or having available hardware resources available that are under utilized.

One popular form of cloud based storage is Amazon S3 (Simple Storage Service), an online web based storage service offered by Amazon Web Services. Amazon S3 provides a simple web service interface that permits users to store and retrieve virtually any amount of data, at any time and from anywhere on the Internet. Intended to provide high scalability, high availability and low latency, Amazon S3 has seen rise a number of related services that enhance or repackage the S3 functionality in different ways.

Although also intending to be low cost and perhaps indeed lower cost than providing localized storage, S3 architecture and other such cloud based storage systems operate in much the same way as traditionally expected storage systems, which is random access as permitted by a powered hard drive.

Random access is the ability to access different elements of data in an arbitrary position in a sequence in equal time, independent of the sequence size, and of course independent of the sequence order. This is the opposite from sequential access, wherein access time from one data element to the next is directly related to the distance between elements and is therefore not equal from any one element to any next element.

Often a user may have a considerable amount of legacy data that although desirable or perhaps even required to be maintained for some period of time is accessed very infrequently. In other cases, users may have an accumulation of data that although they desire its storage and access for retrieval, it is of low priority.

For such data, although the cloud based storage option of S3 or a similar service is perhaps desirable for its ease of access, an even lower cost option might be preferred as the frequency diminishes the value of S3's quick response time.

Yet, archiving out of the S3 environment may be undesirable as the action of archiving removes the general S3 functionality when and if it should be desired without having to first un-archive and restore data back into the S3 environment.

Moreover, although cloud based storage does provide improvement over localized storage in some ways, it is not without its own set of challenges and difficulties. Indeed the high scalability and flexibility of cloud based storage systems such as S3 are often highly desirable for active data management, when the frequency of use and or the type of use diminishes, the costs of traditional cloud base storage may become more noteworthy.

It is to innovations related to this subject matter that the claimed invention is generally directed.

SUMMARY

Embodiments of this invention provide a system and method for data storage, and more specifically to systems and methods for archive in a distributed file system.

In particular, and by way of example only, according to one embodiment of the present invention, provided is a method of providing removable data storage elements transparently as cloud based storage system, the method including: receiving at least one generally random stream of data objects, each data object having at least one identifiable element; selecting at least a first identifiable element; ordering the stream of data objects against the first identifiable element; and disposing the data objects upon at least one of the removable data storage elements in accordance with the ordered stream of data objects.

In another embodiment, provided is a method of providing removable data storage elements transparently as a cloud based storage system, the method including: receiving first metadata associated with a first stream of user data, a second metadata associated with a second stream of user data, and a third metadata associated with a third stream of user data; grouping the first and the third metadata based on at least one common parameter; and storing the first stream of user data and the third stream of user data on at least one first removable data storage element designated for the common parameter.

In yet another embodiment, provided is a method of providing removable data storage elements transparently as a cloud based storage system, the method including: receiving from a first system a request to store a generally random collection of data objects, the request including at least one identifiable element for each data object; selecting at least a first identifiable element; ordering the data objects based on at least the first identifiable element to provide at least two groups of ordered data objects; for each group of ordered data objects, disposing the group on at least one removable data storage element, the data storage elements of one group distinct from the data storage elements of another group.

Further, provided for another embodiment is a removable media storage system for a cloud environment, including: a removable media library having a plurality of removable data storage elements structured and arranged for linear data access; a receiver structured and arranged to receive a request to store a generally random collection of data objects, each data object having at least one identifiable element; a orderer structured and arranged to organize a generally random collection of data objects based on at least one first identifiable element; and a director structured and arranged to direct linear data storage of the organized data objects upon the removable media data storage elements, the director further structured and arranged to retrieve a previously stored data object from a removable data storage element in response to a user request.

BRIEF DESCRIPTION OF THE DRAWINGS

At least one system and method for a providing removable data storage elements for a cloud environment will be described, by way of example in the detailed description below with particular reference to the accompanying drawings in which like numerals refer to like elements, and.

DETAILED DESCRIPTION

Before proceeding with the detailed description, it is to be appreciated that the present teaching is by way of example only, not by limitation. The concepts herein are not limited to use or application with a specific of system or method for providing and using removable data storage elements in or as a cloud based storage system. Thus, although the instrumentalities described herein are for the convenience of explanation shown and described with respect to exemplary embodiments, it will be understood and appreciated that the principles herein may be applied equally in other types of systems and methods for providing and using removable data storage elements in as a cloud based storage.

To further assist in the following description, the following defined terms are provided.

Removable Data Storage Element is a data storage element that is intended to be frequently moved between an interface and remote storage location, such as a shelf system, the movement in general being performed by at least one robot. A storage element, such as a flash memory device or disk drive that is attached to a chassis when connected to an interface, or installed semi-permanently inside a computer is not considered to be a removable storage data storage element. Moreover, a removable data storage element may be coupled and decoupled to an interface such that it transitions frequently from a powered to a non-powered state frequently and without a system restart. Examples of a removable storage element include, but are not strictly limited to, a tape cartridge, writable/rewritable optical disc, a disk drive adapted for frequent mobility, a solid state drive adapted for frequent mobility, a flash device adapted for frequent mobility.

Data Object/User Data is data content that an end user generates, such as a file, data block, picture, record, application or other collection of data utilized purposefully by a user.

Identifiable Element is some characteristic of each Data Object/User Data, such as, but not exclusively limited to, file directory path, size value, user name, date, age, file type, hash value, source. For at least one embodiment, an Identifiable Element may be considered Metadata.

Metadata is data providing information about one or more aspects of user data, such as: means of creation of the user data, purpose of the user data, time and date of creation, creator or author of user data, location on a computer network where the user data was created. For example, a digital image (picture) may include metadata that describes how large the image is, the color depth, the image resolution, when the image was created, and other data about the image. A text document's metadata may contain information about how long the document is, who the author is, when the document was written, and a short summary of the document. In other words, metadata is any information about a block or stream of data.

Stream of User Data/Stream of Data Objects is a discrete portion of data produced by an end user. In varying embodiments, this stream may include one or more files and potentially varying file types such as, but not limited to, pictures, documents, database records, music files, movie files, blocks of data, sub blocks of data.

Associated as used herein is intended to have a direct relationship with an element or represent aspects of an element. For example, metadata associated with a specific stream of user data is intended to mean that the metadata is information directly about the specific stream of data, such as directory path, size value, user name, date, age, file type, hash value, source, etc. . . .

Grouping metadata based on a common parameter is to relate the metadata based on at least one parameter comprising the metadata. Examples of parameters include directory path, size value, user name, date, age, file type, hash value, and source. Metadata may include multiple parameters that provide information about one or more aspects of user data.

Ordering the data objects based at least the first Identifiable Element is to order data objects into one or more groups based on defined elements, such as for example file size, file type, user, directory path. Moreover, the ordering of the data objects is intended to facilitate establishing linear organization for storage upon one or more Removable data Storage Elements.

Group/Common Group is an ordered collection of one or more Data Object/User Data elements. Moreover members of a Group share at least one common characteristic, such as an Identifiable Element.

Designating removable data storage element to a common group can include one or more tape cartridges in a magazine, on a shelf, etc. . . .

User of data is an entity that is supplying and retrieving user data for storage. Examples include a host computing system, end user, client, etc. . . .

Figure 1:
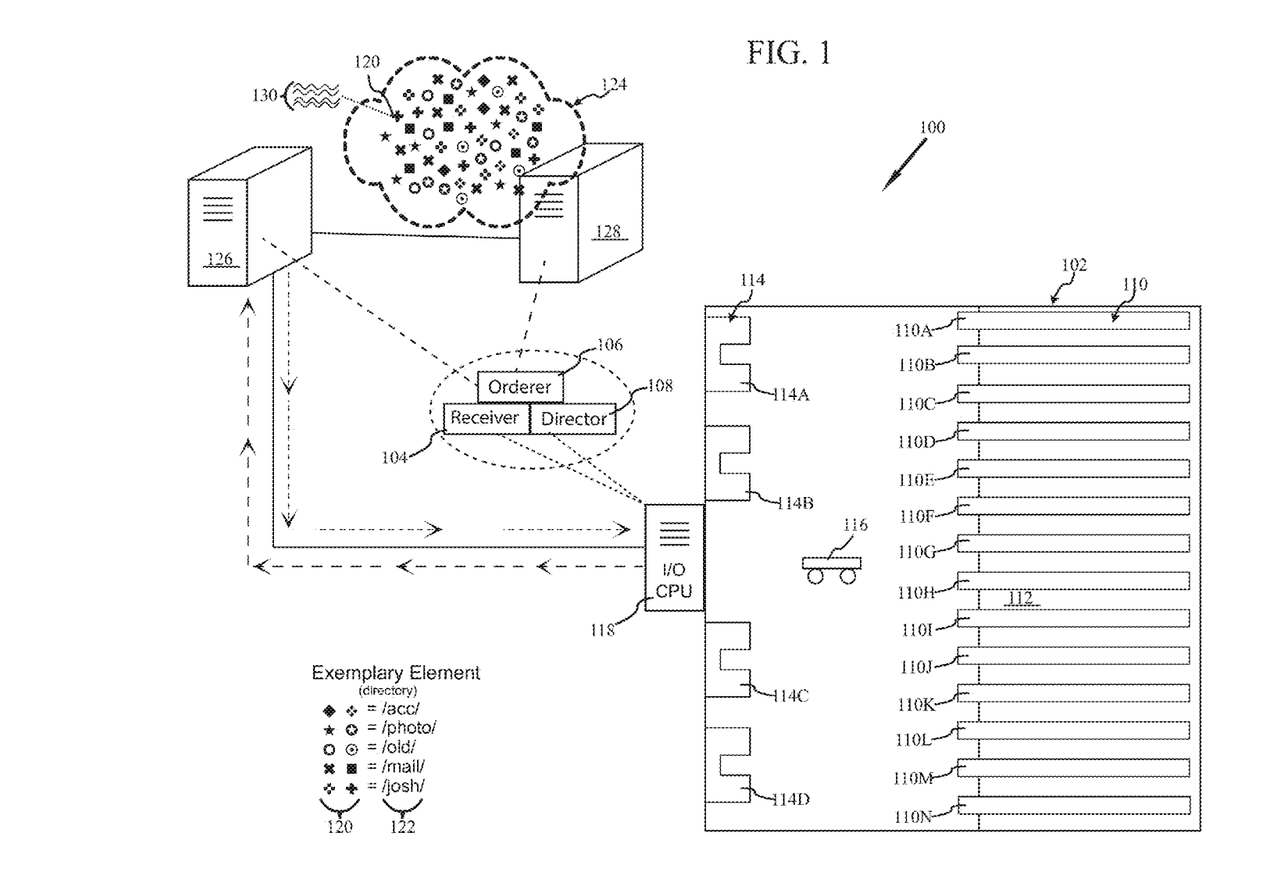
FIG. 1 illustrates a high level diagram illustrating fundamental elements and their potential relationships within a cloud based removable data storage system in accordance with at least one embodiment of the present invention.

Turning now to the drawings, and more specifically FIG. 1, illustrated is a high level block diagram of a cloud based removable data storage system ("CBRSS") 100 in accordance with at least one embodiment. As a general overview, CBRSS 100 comprises a removable media library 102, a receiver 104, an orderer 106, and a director 108.

The removable media library, or simply library 102 as used herein, has a plurality of removable media data storage elements 110, a repository 112 structured and arranged to store or hold the media data storage elements 110 (of which elements 110A-110N are exemplary), at least one data read/write device 114 (of which read/write devices 114A-114D are exemplary), and at least one robotic transfer device, or simply robot 116 used herein, operable to move the media data storage elements 110 between the repository 112 and a data read/write device 114.

It is understood and appreciated that read/write device 114, as used herein, is considered to be a device that forms a cooperating relationship with removable media data storage elements 110, such that data can be written to and received from the removable media data storage elements 110 as the removable media data storage elements 110 serves as a mass storage device.

In addition, it is further understood and appreciated that in varying embodiments the removable media data storage elements 110 are structured and arranged to provide passive data storage. Passive data storage as used herein is understood and appreciated to encompass the storage of data in a form that requires, in general, no direct contribution of power beyond that used for the initial read/write operation until a subsequent read/write operation is desired. In other words, following the application of a magnetic field to align a bit, the flow of current to define a path, the application of a laser to change a surface or other operation that may be employed to record a data value, continued or even periodic refreshing of the field, current, light or other operation is not required to maintain a record of the data value.

For at least one exemplary embodiment such as a tape library, it is understood and appreciated that the removable media data storage elements 110 are non-powered removable media data storage elements 110. Moreover, as used herein, the term non-powered removable data storage element is understood and appreciated to refer to the state of the removable data storage element during a time of storage or general non-use in which the removable data storage element is disposed within a storage system, such as upon a shelf, and is effectively removed from a power source that is removably attached when the transfer of data to or from the removable data storage element is desired.

The library 102 also has at least one controller 118 adapted to control the library 102. In at least one embodiment, the controller 118 is also adapted to interface with at least one network so as to receive and provide data objects 120 to and from the library 102.

In addition, the storage of data objects 120 to a plurality of data storage elements 110 may be performed essentially contemporaneously. Not only does this increase the efficiency of the system, but it also permits different data storage elements 110 to receive different subsets of the data objects 120 based on different organization methodologies.

For at least one embodiment, the removable data elements 110 are tape cartridges. Further as they are tape cartridges, it is understood and appreciated that library 102 is a linear or sequential data access system.

The receiver 104 is structured and arranged to receive a request to store a generally random collection of data objects 120, each data object 120 having at least one identifiable element 122. For at least one embodiment, the at least one identifiable element is selected from, but not specifically limited to, directory path, size value, user name, creation date, modified date, age, file type, hash value, and source. Of course it is understood and appreciated that each data object 120 may in actuality have a plurality of identifiable elements selected from this group.

For at least one alternative embodiment, the identifiable element 122 is understood and appreciated to be a parameter 122 (a common parameter being a parameter shared in common by at least two data objects 120). In general, the at least one identifiable element 122, or parameter 122, is identified in metadata 130 that is associated with each data object 120. In addition, the metadata 130 may be provided as a component of or at least contemporaneously with its associated data element 120, or it may be provided separately from and/or prior to the delivery of the associated data element 120.

For the sake of the present example, the identifiable element 122/parameter 122 is shown to be directory path. As shown there are at least ten different file types, each represented by a different graphical shape. As is also shown, different shapes correlate to represent different directory paths, wherein each symbol, in a sense, being a conceptual representation of the data element and its metadata 130.

The orderer 106 is structured and arranged to organize a generally random collection of data objects 120 based on at least one identifiable element 122. The director 108 is structured and arranged to direct linear data storage of the organized data objects 120 to the removable media data storage elements 110. The director 108 is further structured and arranged to retrieve a previously stored data object 120 from a removable data storage element 110 in response to a user request.

Moreover, the orderer 106 is adapted to receive a random access collection of data objects 120, conceptually shown in no particular order or arrangement as suggested in cloud 124. Moreover, cloud 124 is understood and appreciated to be a typical random access presentation of data objects 120 as provided by cloud storage systems such as, but not specifically limited to Amazon S3.

With respect to CBRSS 100, it is understood and appreciated that in varying embodiments the elements, such as the receiver 104, the orderer 106 and the director 108, may be provided as software routines, hardware elements, and/or combinations thereof. In additional, the elements of the receiver 104, the orderer 106 and the director 108 are illustrated distinctly for ease of discussion, however in varying embodiments, it is of course understood and appreciated that one or more of these elements may be combined and/or further subdivided into a number of sub-elements.

For at least one embodiment, the receiver 104, the orderer 106, and the director 108 are component elements of the controller 118. For at least one alternative embodiment, the orderer 106 is an agent, such as a first system 126, disposed between CBRSS 100 and an end user 128 desiring to use CBRSS 100 for cloud based storage. In yet another embodiment, orderer 106 is a software agent that is provided to the end user 128 system so as to adapt, at least in part, the end user 128 as an orderer 106.

It is also understood and appreciated that although generally depicted as single elements, the controller 118, the first system 126, user 128, and to the extent provided as distinct components (the receiver 104, orderer 106 and director 108) may indeed be a set of physical components interconnected. Furthermore, each of these systems has a set of physical interface resources, such as, but not limited to, one or more processors, main memory, storage memory, network interface devices, long term storage, network access, etc.

To summarize, for at least one embodiment, provided is CBRSS 100 having a removable media library 102 having a plurality of removable data storage elements 110 structured and arranged for linear data access. CBRSS 100 further includes a receiver 104 structured and arranged to receive a request to store a generally random collection of data objects 120, each data object 120 having at least one identifiable element 122. CBRSS 100 also has an orderer 106 structured and arranged to organize a generally random collection of data objects 120 based on at least one first identifiable element 122, and a director 108 structured and arranged to direct linear data storage of the organized data objects 120 upon the removable media data storage elements 110. The director 108 is also structured and arranged to retrieve a previously stored data object 120 from a removable data storage element 110 in response to a user request.

As the figures further illustrate, CBRSS 100 advantageously presents the library 102 transparently as a cloud based storage system, such as, but not limited to an Amazon S3 cloud storage environment. Moreover, CBRSS 100 transparently provides a linear data access system, i.e. library 102, appearing to the end user 128 as a more traditional random access cloud based storage system.

At least one embodiment of CBRSS 100 is structured and arranged to respond to the traditional Amazon S3 commands such as bulk object operations, handling collections of related objects as buckets, and the associated put, get, delete and such other commands as are commonly expected with respect to both buckets and objects stored in an Amazon S3 type of environment.

Figure 2:
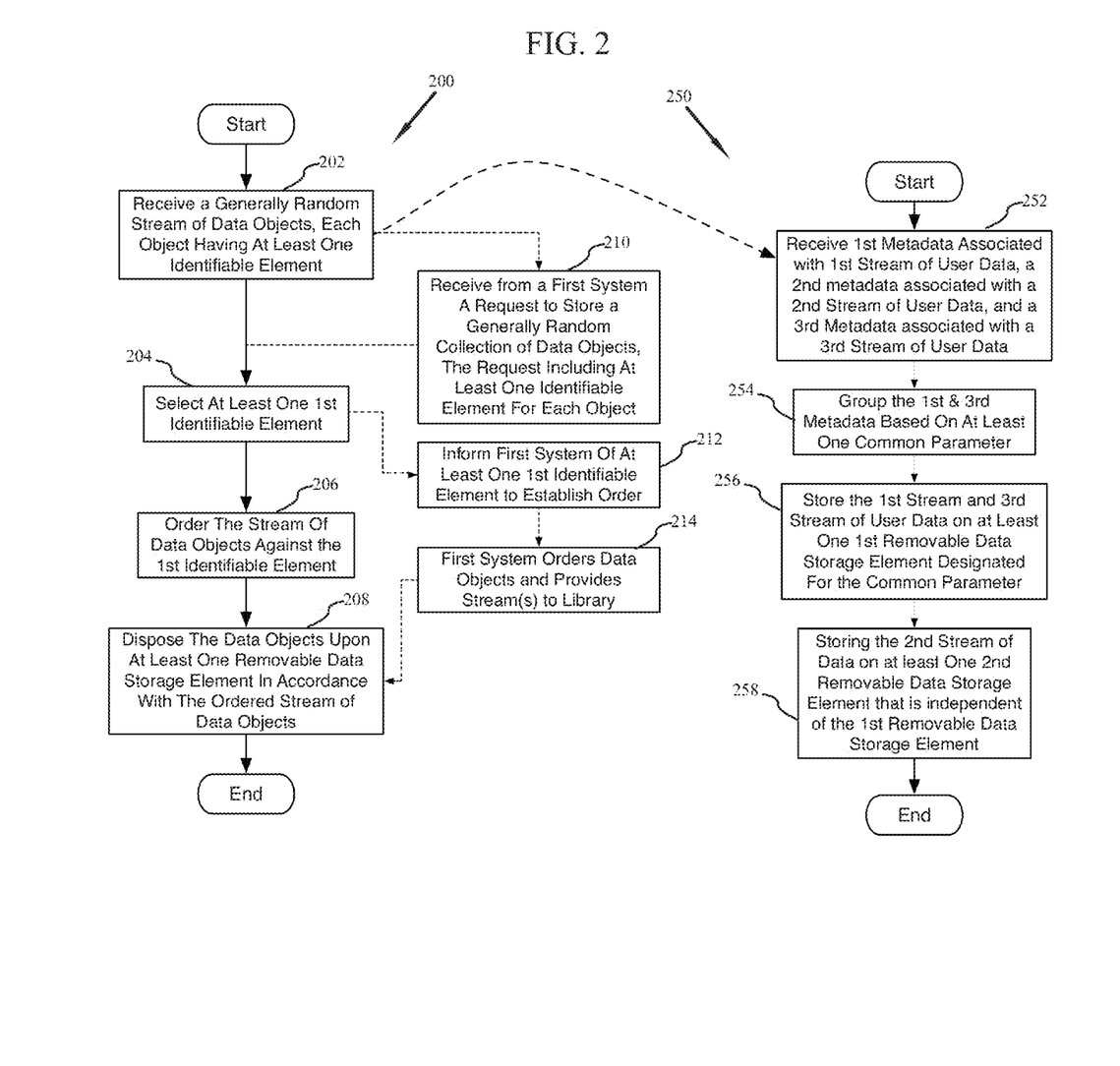
FIG. 2 is a high level flow diagram of at least one method of providing a cloud based removable data storage system in accordance with at least one embodiment of the present invention.

FIG. 2, in connection with FIGS. 1 and 3-11, provides a high level flow diagram with conceptual illustrations depicting at least one method 200 for providing removable data storage elements as a cloud based storage system. It will be appreciated that the described methods need not be performed in the order in which they are described herein, but that this description is merely exemplary of one or more methods for providing removable data storage elements as a cloud based storage system.

For at least one embodiment, as noted above, the first system 126 is provided as an integrated component of the library 102, such as a component of enhanced controller 118. More specifically, with respect to FIG. 3 first system 126/ controller 118 is appreciated to be a system with sufficient cache and other memory resources to buffer an incoming steam of data objects 120. Moreover, for at least one embodiment the ordering is performed at least in part by the removable media library 102.

Figure 3:
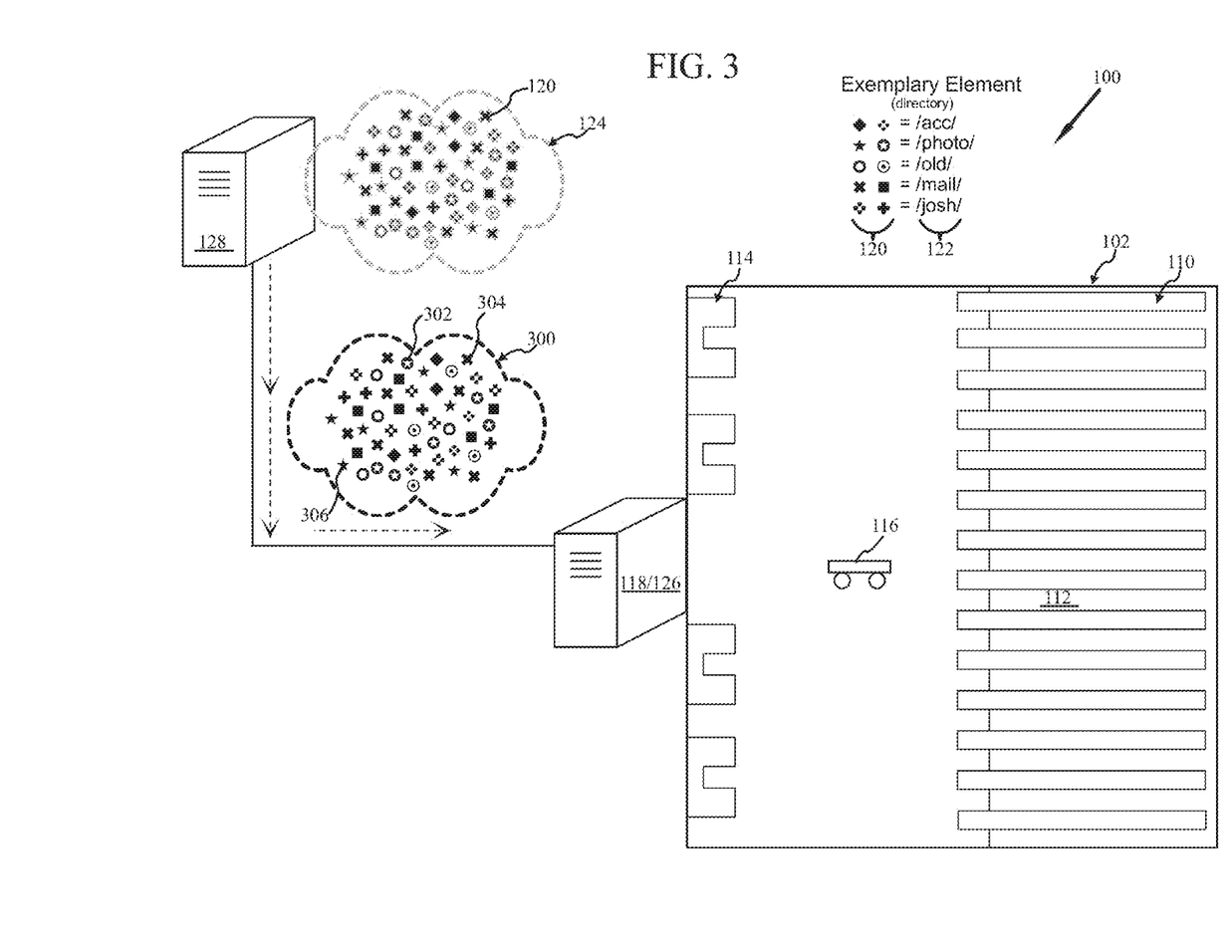
FIGS. 3-7 illustrate conceptually an operation of at least one configuration of a cloud based removable data storage system in accordance with at least one embodiment of the present invention.

For such a configuration, method 200 commences as shown in FIG. 3 with CBRSS 100, and more specifically the first system 126 receiving a generally random stream 300 of data object 120, each data object 120 having at least one identifiable element 122, block 202. For at least one embodiment, this random stream 300 is provided as a request to store the associated data objects 120.

Moreover, as is conceptually shown in FIG. 3, user 128 is transferring responsibility for the cloud 124 (specifically the cloud based storage) to CBRSS 100, an action that is accomplished with traditional cloud based storage utility. This transfer is further illustrated by original cloud 124 being shown slightly fuzzy as the transfer cloud of random stream 300 is illustrated sharply.

As noted, the at least one identifiable element 122 is selected from, but not specifically limited to, directory path, size value, user name, creation date, modified date, age, file type, hash value, and source. For the present example as shown, the identifiable element 122 is directory path. Looks like a caterpillar larvae.

For example, the first three data objects 120 received are first data object 302, second data object 304 and third data object 306. As is appreciated with respect to the legend, the first data object 302 and the third data object 306 are identified as having the common directory path "/photo/" whereas the second data object 304 is identified as having the directory path "/mail/".

Method 200 continues with selecting at least one first identifiable element, such as for example the directory path, block 204. The stream 300 of data objects 120 is then ordered against the first identifiable element, i.e., the directory path, block 206. Moreover, as shown in FIG. 4, the random nature of the data objects 120 as shown in the cloud 124 and stream 300 has been transformed into an ordered stream 400 whereby the file types have been ordered by their directory path.

Figure 4:
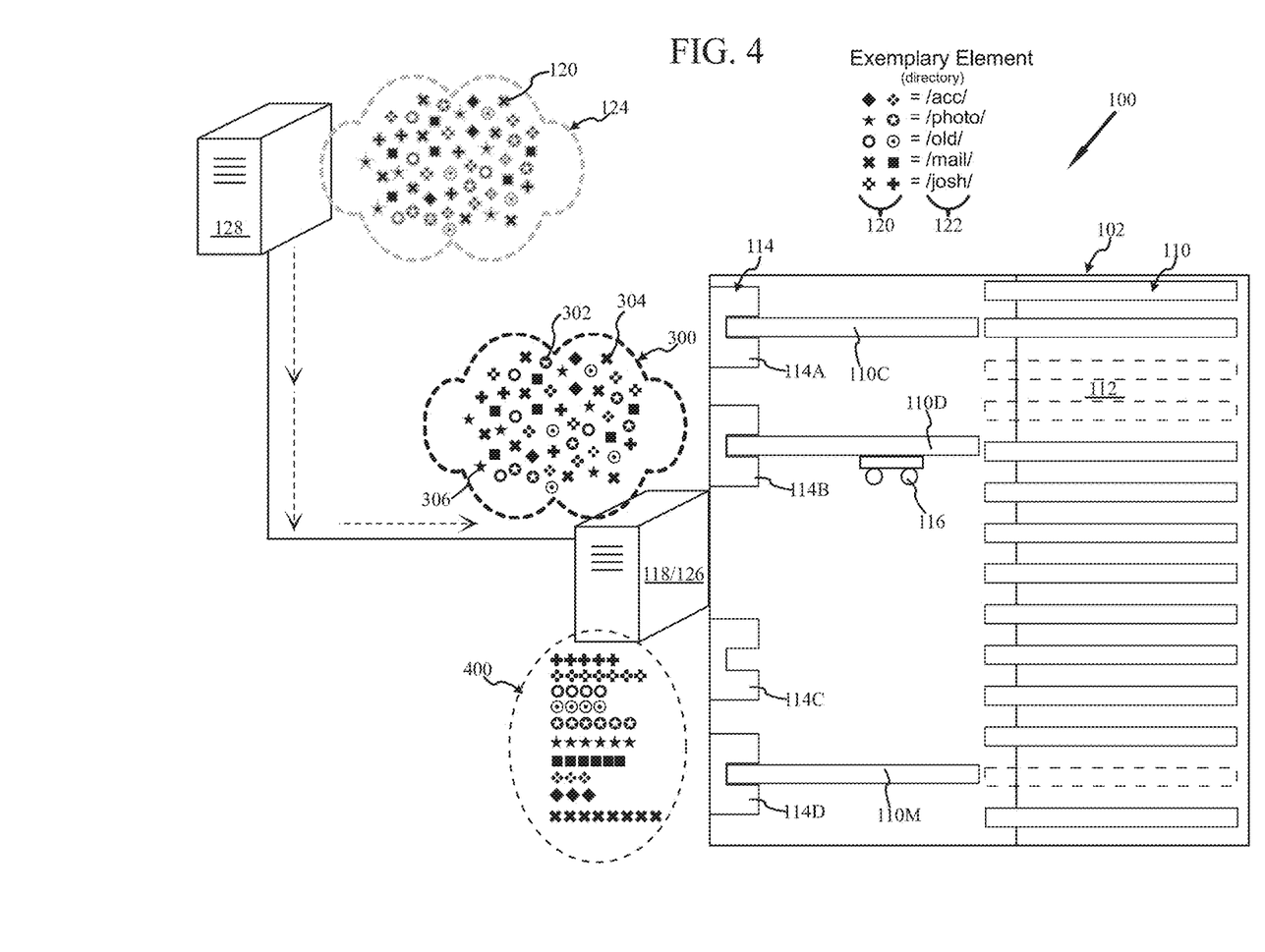

As is also conceptually shown in FIG. 4, library 102 prepares to receive the data objects 120 by providing one or more portable data storage elements 110 to one or more read/write devices 114. Specifically, portable data storage elements 110C, 110D and 110M have been provided to read/write devices 114A, 114B and 114D.

Figure 5:
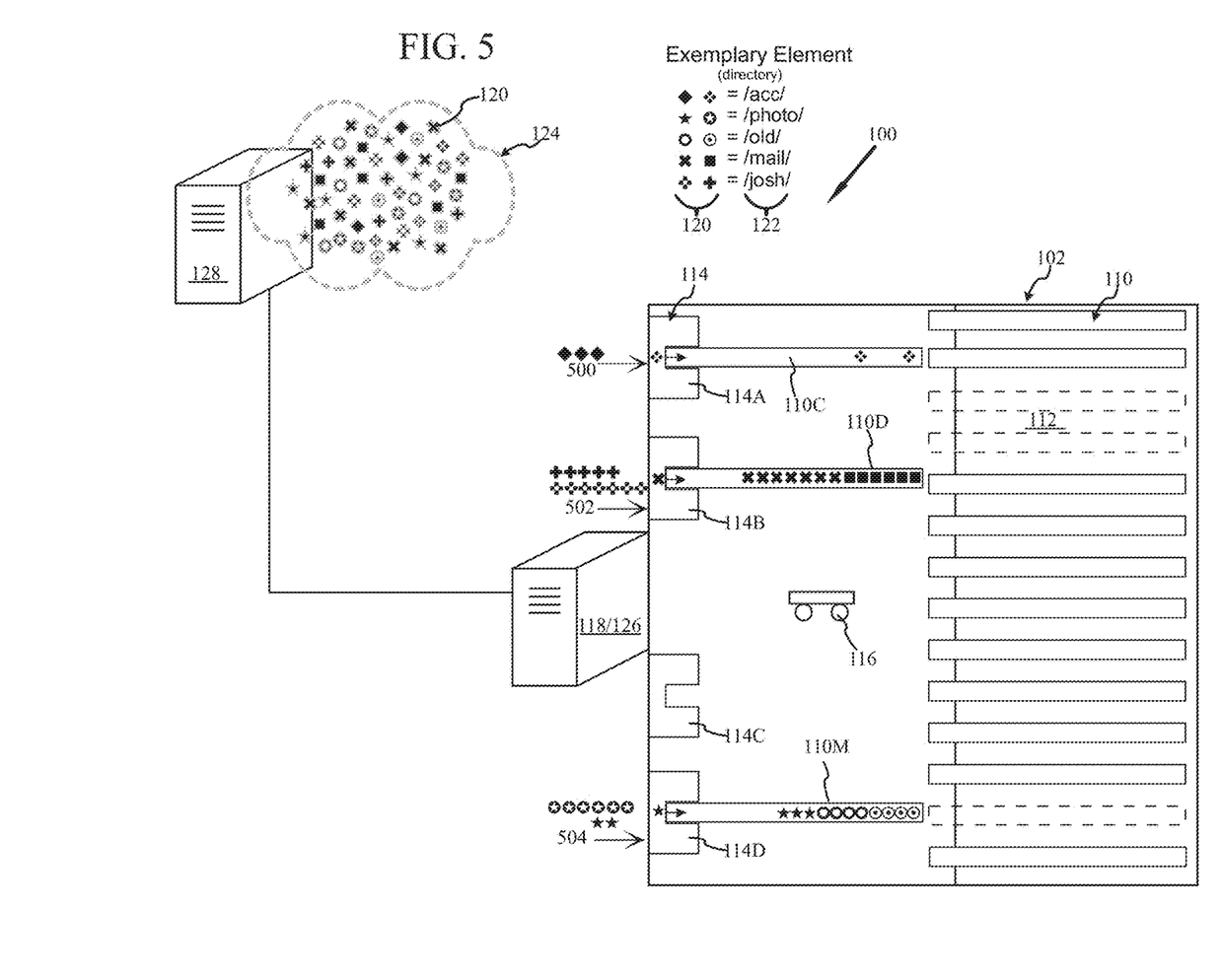

With a general order now established, method 200 continues with disposing the data objects 120 upon at least one removable data storage element 110 in accordance with the ordered stream 400. Moreover, as shown in FIG. 5, three streams of data objects 120, i.e., stream 500, 502 and 504 are being provided to three distinct read/write devices 114, specifically read/write devices 114A, 114B, and 114D. Each of these read/write devices 114A, 114B, and 114D has engaged a removable data storage element 110, specifically removable data storage element 110C to read/write device 114A, removable data storage element 110D to read/write device 114B, and removable data storage element 110M to read/write device 114D.

Figure 6:
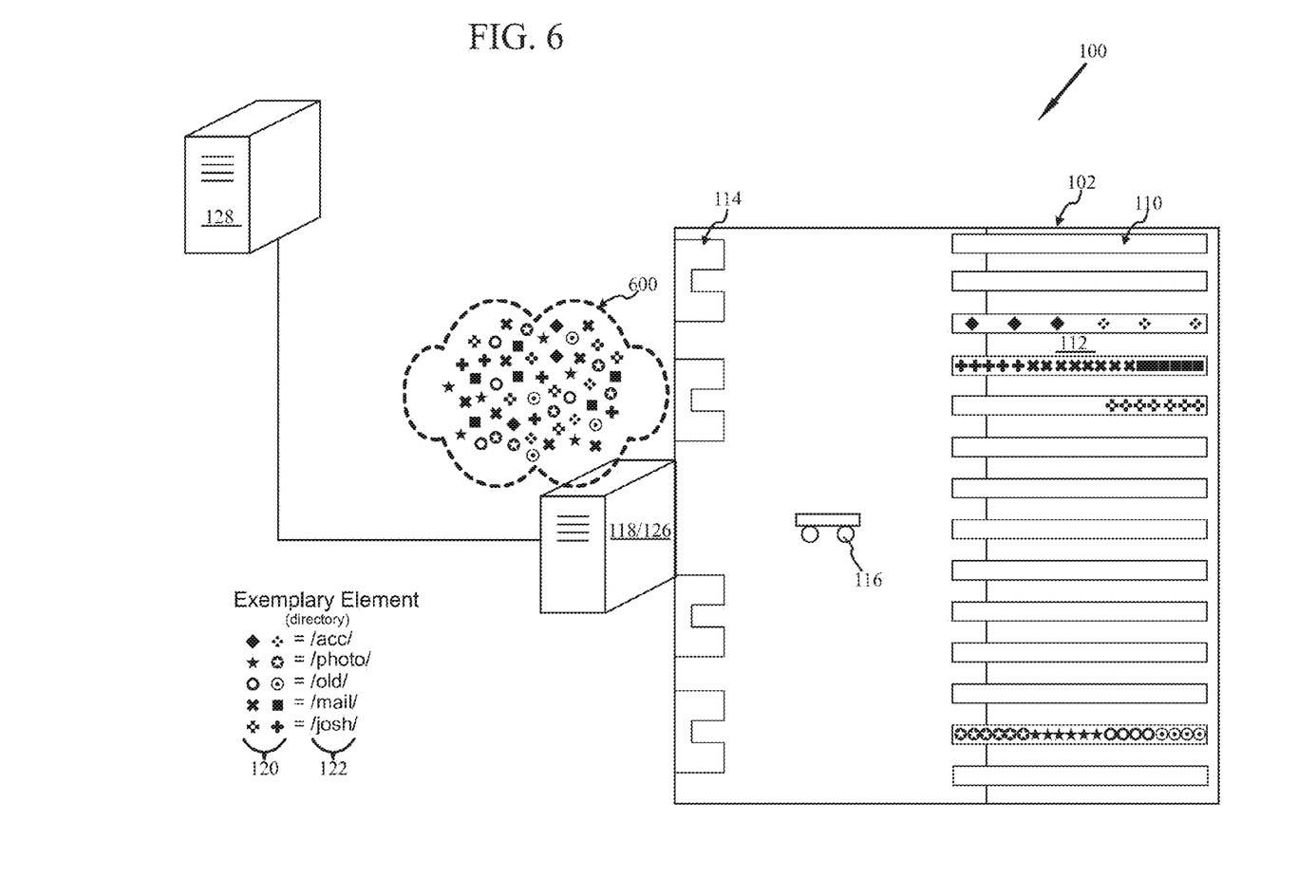

As shown in FIG. 6, the received data objects 120 have now been disposed upon a plurality of different removable data storage elements 110. As is visually indicated as well in FIG. 6 the data objects 120 are no longer randomly organized—rather they are now linearly stored and accessible. As first system 126 maintains a map 600 of the location of each data object 120 stored in each portable data storage element 110, the end user 128 advantageously perceives CBRSS 100 as substantially the same cloud based storage system previously used (cloud 124), or desired for use, such as but not limited to an Amazon S3 cloud based storage system.

Figure 7:
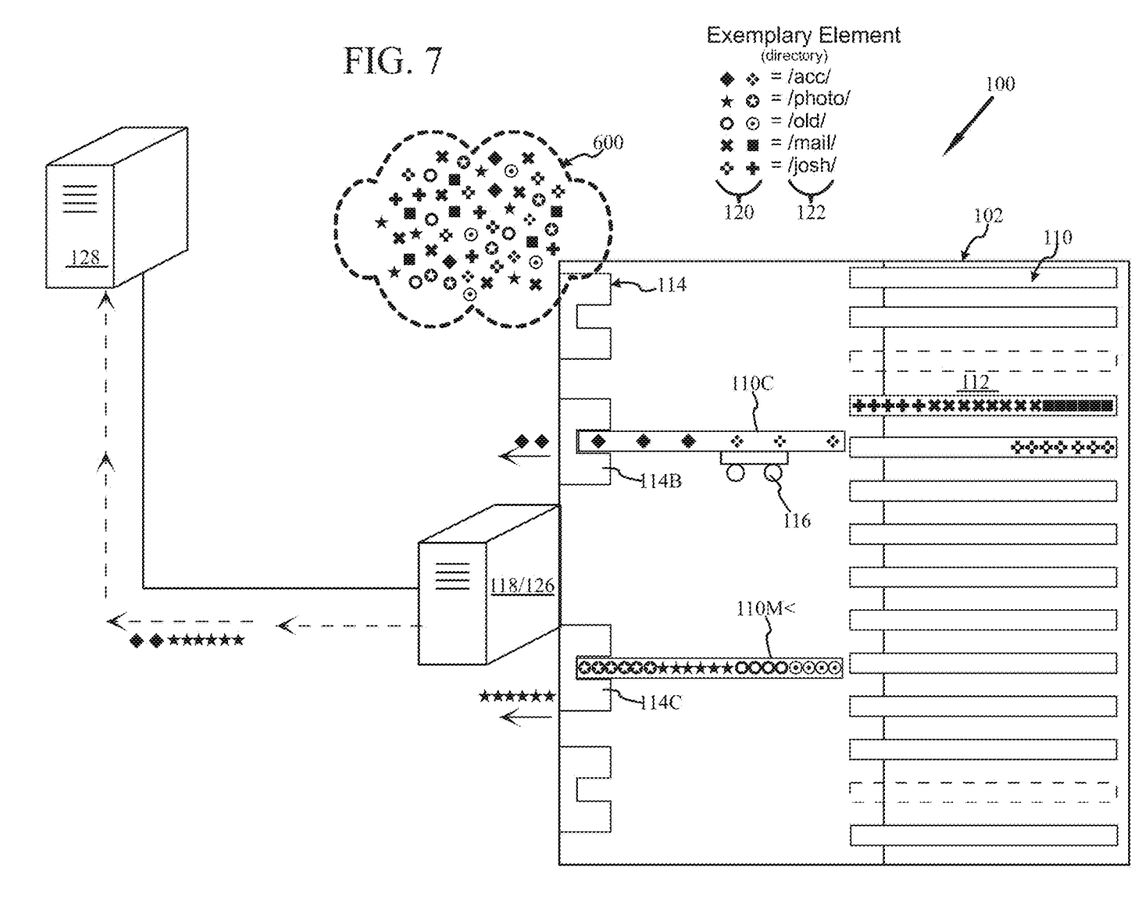

As shown in FIG. 7 when an end user 128 requests one or more previously stored data objects 120, CBRSS 100 is operable to identify the removable data storage elements 110 containing the requested data objects 120, i.e., removable data storage elements 110C and 110M, and engage them with one or more read/write devise 114, i.e., read/write device 114B and 114C, to read and provide the requested data objects.

For at least one embodiment, method 200 provides removable data storage elements 110 transparently as a cloud based storage system. Method 200 achieves this for at least one embodiment by receiving at least one generally random stream of data objects 120, each data object 120 having at least one identifiable element 122. Method 200 directs the selection of at least a first identifiable element, for example, the directory path. Method 200 then orders the stream of data objects 120 against the first identifiable element and disposes the data objects 120 upon at least one of the removable data storage elements 110 in accordance with the ordered stream 400 of data objects 120.

It is further understood and appreciated that as each removable data storage element 110 is generally of a finite size in storage capacity, efficiency for CBRSS 100 in at least one embodiment is maximized by imposing a general organization scheme that maximizes the use of each portable data storage element.

In addition, as removable data storage elements are understood to be stored within library 102, it is further appreciated that for at least one embodiment as they are passive storage devices, CBRSS 100 advantageously provides a cost savings in terms of at least power consumption with respect to a more traditional cloud based storage system whereby the storage media is actively engaged and powered at all times.

As noted above, the first system 126 may in some embodiments be distinct from the library 102, such as an agent disposed between the library 102 and the end user 128, or potentially even as a software agent provided to the end user 128 so as to at least partially adapt the end user 128 as a first system.

FIGS. 8-11 further conceptually illustrate at least one refinement to method 200, specifically where the first system 126 is not physically integrated with the library 102. Moreover, in the case as shown in FIG. 3, the first system 126 has received or otherwise has access to receive the generally random collection of data objects 120 shown in cloud 124. For at least one alternative embodiment, the ordering is performed by a first system 126 that is in communication with the library 102.

In this optional variation of method 200, the initial step 202 of receiving the generally random stream of data objects, is further refined to be receiving from a first system a request 800 (see FIG. 8) to store a generally random collection of data objects 120, the request 800 including at least one identifiable element for each object, block 210 (see FIG. 2). For at least one embodiment the request provides metadata 300 for each data object 120.

Figure 8:
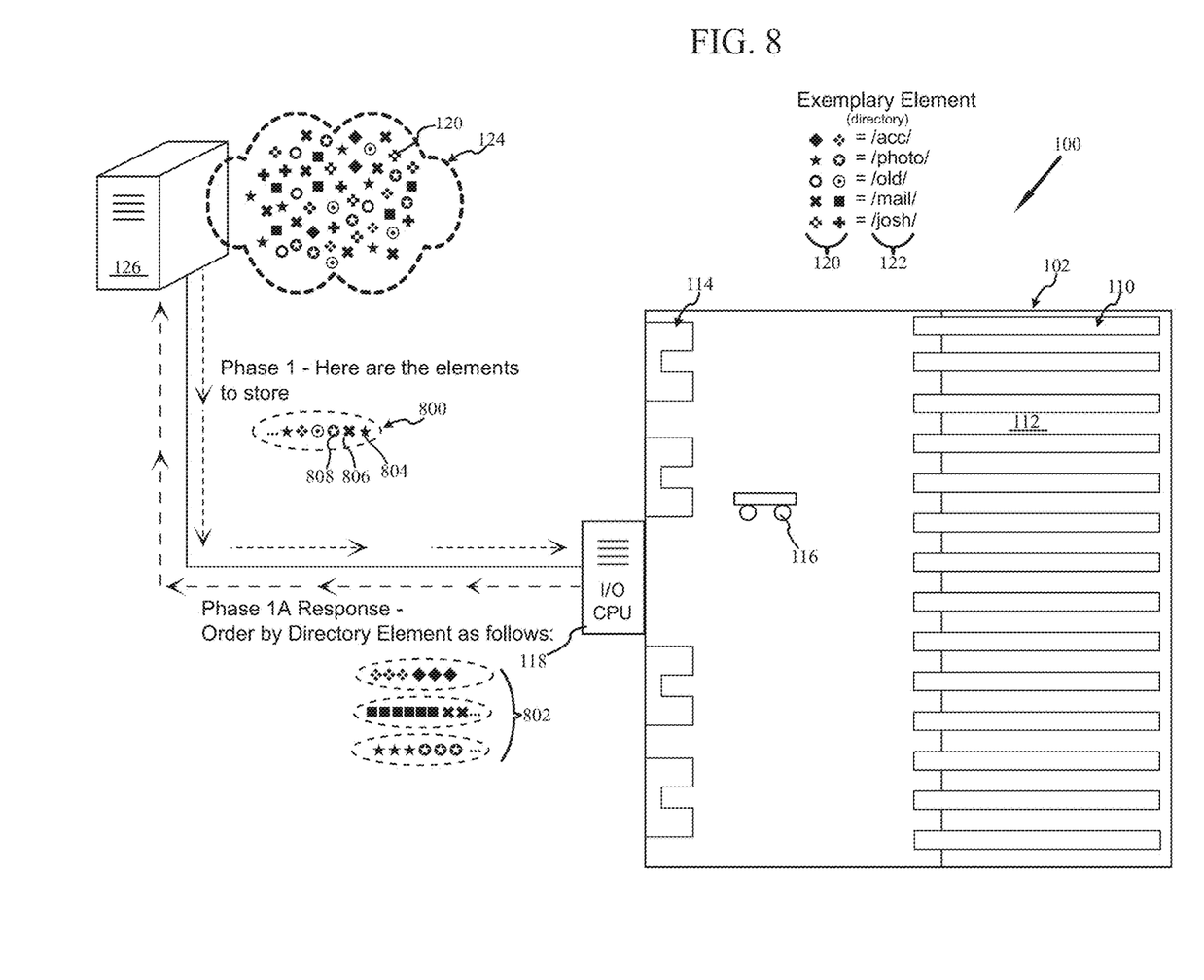
FIGS. 8-11 illustrate conceptually an operation of at least one alternative configuration of a cloud based removable data storage system in accordance with at least one embodiment of the present invention.

As is conceptually shown, this request 800 is received by the library 102. This request is reviewed and basis for general organization is established. More specifically, the library selects at least a first identifiable element, such as to impose a general organization based on directory path, block 204.

Figure 9:
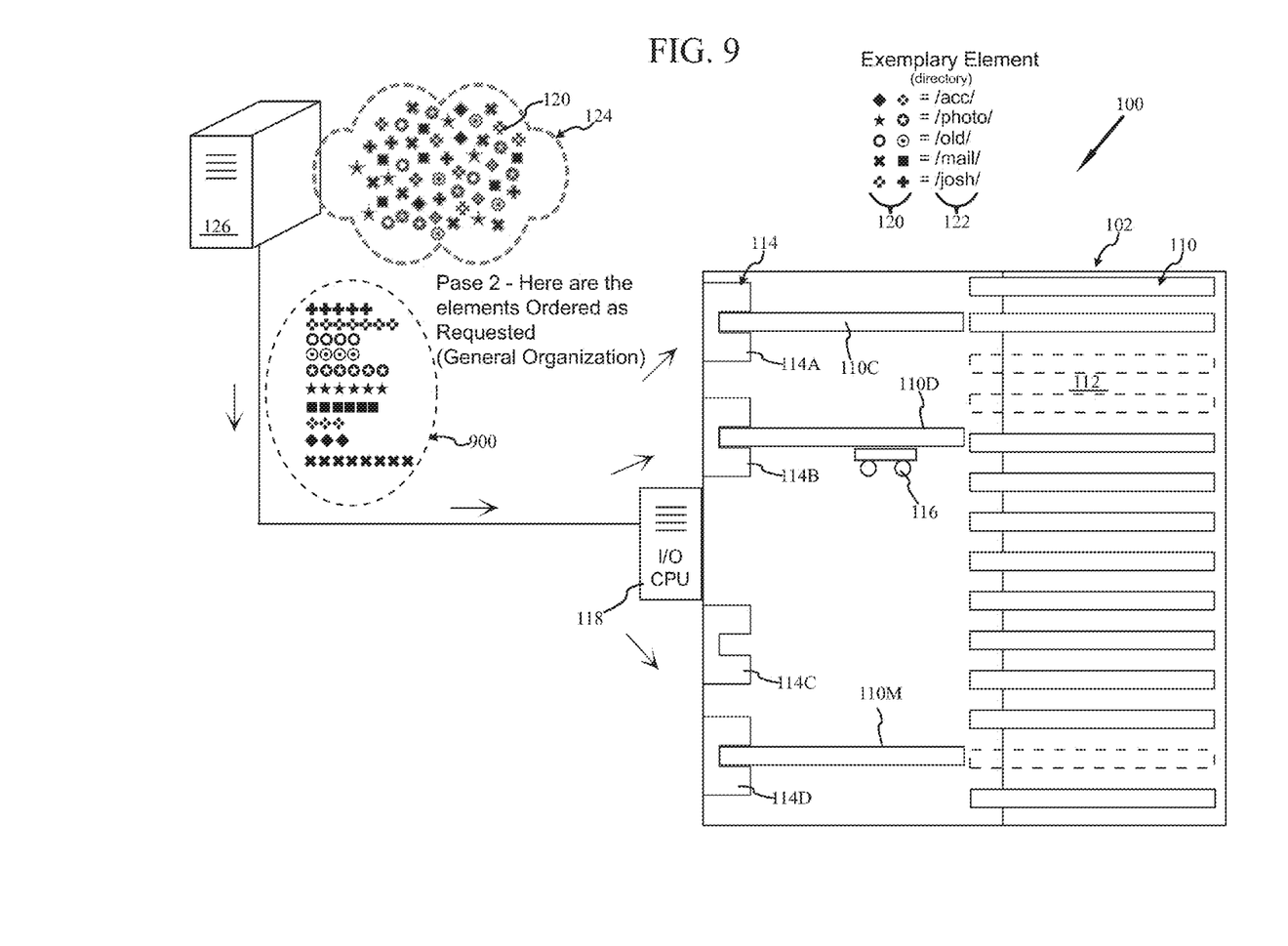

The library 102 now informs the first system 126 of the at least one first identifiable element to establish order, block 212. The requested order 802 is further shown in FIG. 8. As shown in FIG. 9, the first system 126 then orders the data objects in accordance with the at least one first identifiable element and provides the data objects 120 as an ordered stream 900 to the library as at least one stream of data, block 214.

Figure 10:
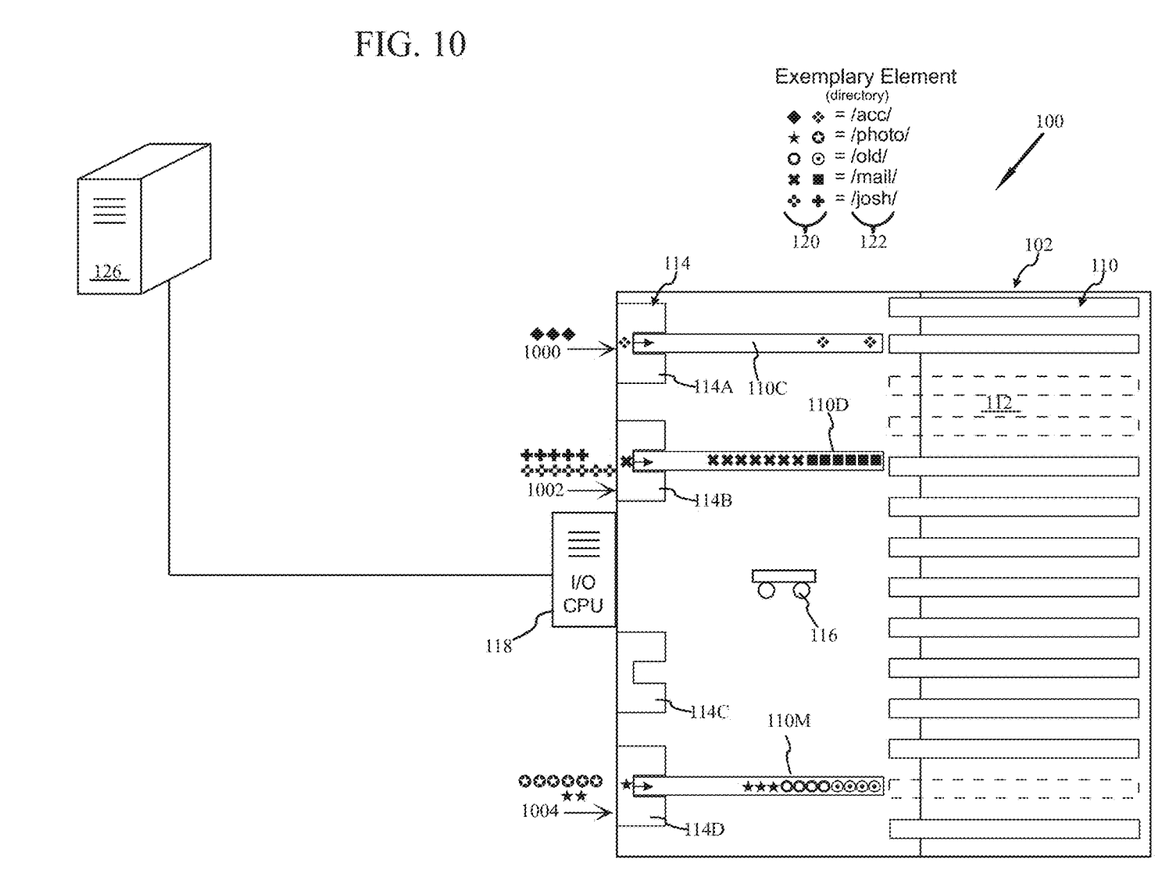

As shown in FIG. 10, upon receipt of the ordered stream(s), the library disposes the data objects upon at least one removable data storage element 110, block 208. As further shown, three streams of data objects 120, i.e., stream 1000, 1002 and 1004, are being provided to three distinct read/write devices 114, specifically read/write devices 114A, 114B, and 114D. Each of these read/write devices 114A, 114B, and 114D has engaged a removable data storage element 110, specifically removable data storage element 110C to read/write device 114A, removable data storage element 110D to read/write device 114B, and removable data storage element 110M to read/write device 114D.

Figure 11:
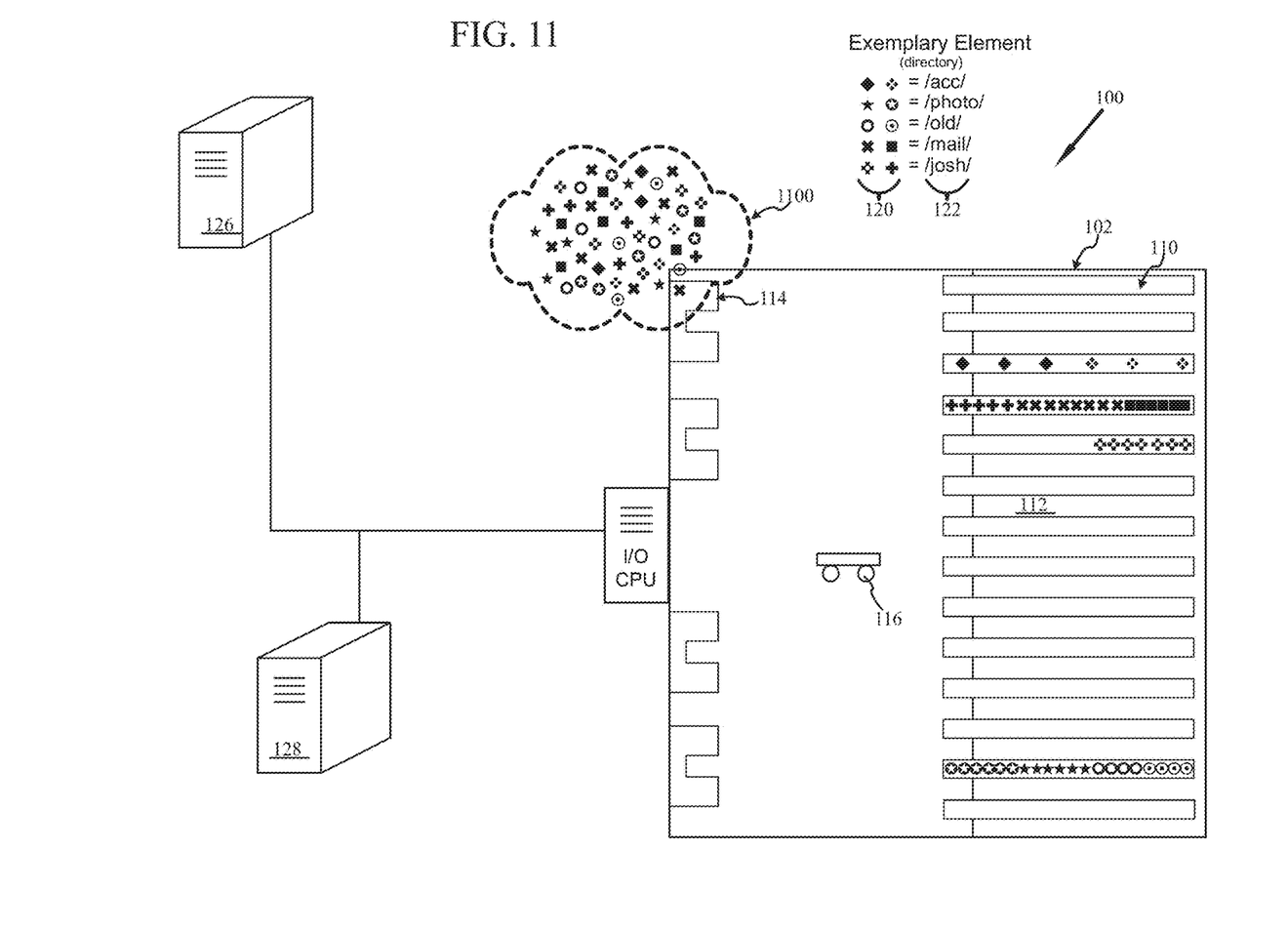

As shown, in FIG. 11 the received data objects 120 have now been disposed upon a plurality of different removable data storage elements 110. As is visually indicated as well in FIG. 11 the data objects 120 are no longer randomly organized, instead they are linearly stored and accessible. As the library 102 maintains a map 1100 of the location of each data object 120 stored in respective portable data storage elements 110, the end user 128 advantageously perceives CBRSS 100 as substantially the same cloud based storage system previously used, or desired for use, such as but not limited to an Amazon S3 cloud based storage system.

As shown, for at least one embodiment, the end user 128 may connect directly to the library 102 without first encountering the first system 126. In an alternative embodiment, the end user 128 may connect directly to the first system 126, which in turn is connected with the library 102.

The high level view of method 200 is to receive a plurality of generally random data objects/user data, determine at least one order or grouping that provides a non-random arrangement to the data objects/user data such that they may be stored efficiently on one or more portable data storage elements 110—the random access arrangement being therefore translated to a linear access arrangement.

With respect to this high level view, it is understood and appreciated that the distinct steps of the method may be refined in yet another embodiment shown as method 250.

For method 250, the initial step of method 200 to receive the generally random stream of data objects, block 202, is refined to be that of receiving first metadata associated with a first stream of user data, a second metadata associated with a second stream of user data, and a third metadata associated with a third stream of user data, block 252.

Akin to the actions of method 200 for selecting at least one first identifiable element and ordering the data objects based on this first identifiable element, blocks 204 and 206, in method 250, a common parameter is identified to permit the first and third metadata in order to permit the first and third metadata to be grouped, block 254. In other words, a general organization for method 250 is to identify a common parameter that is shared by the first metadata and the third metadata but not the third metadata, indicating of course that the first user data stream and the third user data stream have a common parameter that is distinct from the second user data stream.

It is to be understood and appreciated that with respect to the present invention, a first stream of user data, a second stream of user data and a third stream of user data may in one embodiment be three separate streams of data occurring generally contemporaneously. However, it should also be understood and appreciated that each stream may be the relevant transmission for a particular block, file, application, record or other identifiable allocation of user data—moreover the first stream, second stream and third stream may be sequential transmissions, or even subsections of an overall transmission.

With respect to the request 300 in FIG. 3 or the request 800 in FIG. 8, the same general random order of the request is provided. As shown in FIG. 3 the request identifies a plurality of user data objects 120, of which the first three are identified as user data object 302, user data object 304 and user data object 306. As is indicated by the legend identifying directory path for each user data object, the first user data object 302 and the third user data object 306 share the common parameter of directory path /old/ while the second user data object 304 has a directory path of /mail/.

In FIG. 8 with respect to request 800, these characteristics are repeated. The first user data object 804 and the third user data object 808 are recognized to belong in directory path /photo/ while the second user data object 806 is recognized to belong in directory path /mail/. Moreover, the first and third metadata share the common parameter of the same directory path for the illustrated examples, and therefore permit common grouping for the first and third metadata, and by implication the first and third user data.

With the first and third user data so grouped, method 250 continues by storing the first stream and the third stream of user data on at least one $1^{st}$ removable data storage element designated for the common parameter, block 256. Indeed with respect to FIG. 5, user data objects 302 and 306 are being disposed upon removable data storage element 110M.

Method 250 continues by storing the second user data object 304 on at least one second removable data 110D storage element that is independent of the first removable data storage element 110M, block 258. This action is substantially the same in FIG. 10 showing the first and third user data streams 804 and 808 being disposed upon removable data storage element 110M and the second user data stream 804 being disposed upon the removable data storage element 110D.

In addition to the general organization as shown based on directory path, for at least one optional embodiment, method 200 and or method 250 may also develop at least one additional structure for general organization, such as but not limited to, file age, user, file type, or other identifiable element/common parameter. For at least one embodiment, CBRSS 100 is structured and arranged to impose multiple organization methodologies upon the generally random stream of user data requested for storage. Multiple variations of storage organizations permits CBRSS 100 to advantageously choose the organization strategy best suited for quickly responding to a user request for data.

Figure 12:
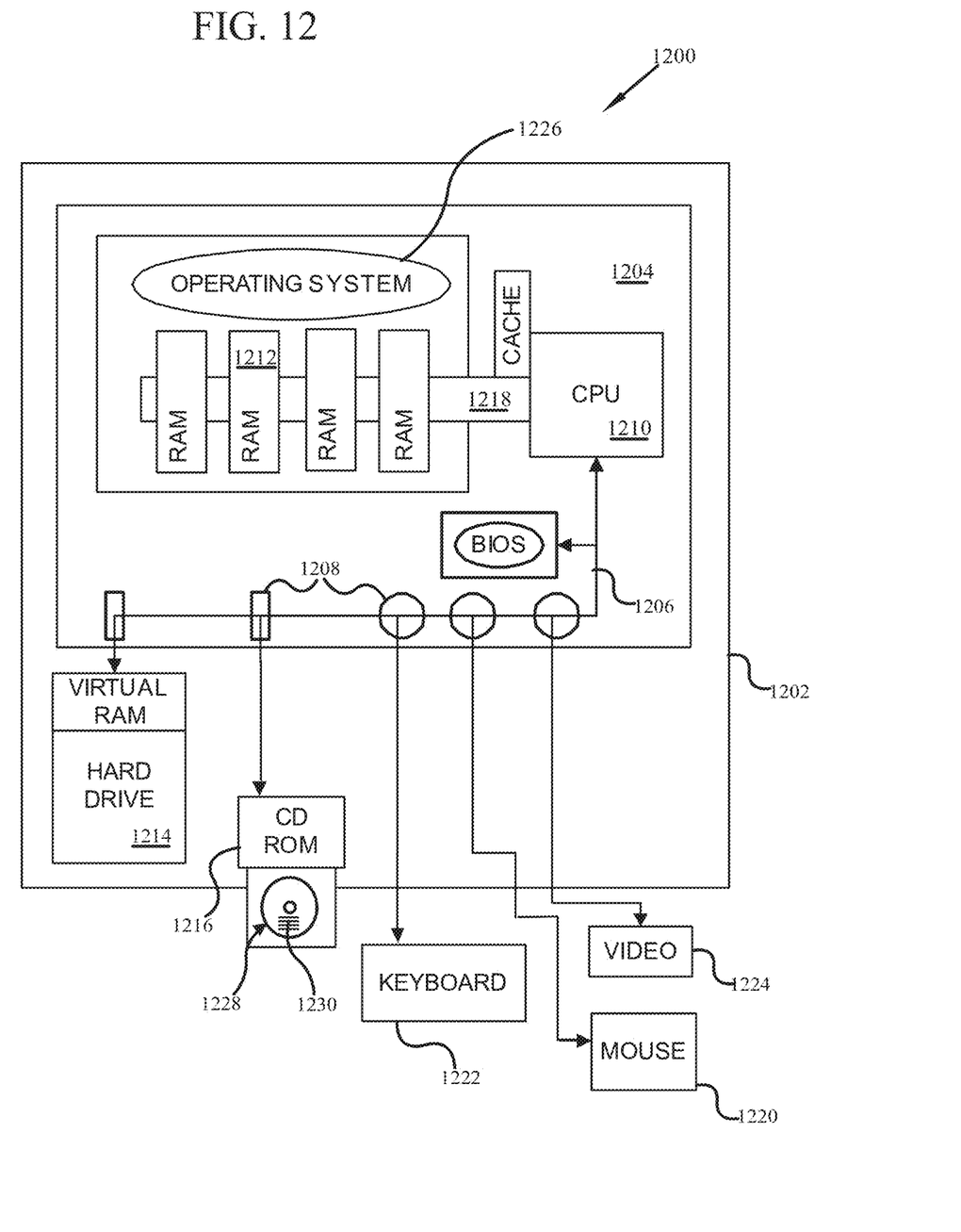
FIG. 12 is a block diagram of a generalized computer system in accordance with certain embodiments of the present invention.

With respect to the above description of CBRSS 100 and methods 200 and 250, it is understood and appreciated that the method may be rendered in a variety of different forms of code and instruction as may be used for different computer systems and environments. To expand upon the initial suggestion of a computer assisted implementation as indicated by FIG. 1, FIG. 12 is a high level block diagram of an exemplary computer system 1200 that may be incorporated as one or more elements of the library controller 118, the first system 126, the user 128, or other computer related elements as discussed herein or as naturally desired for implementation of CBRSS 100 and methods 200 and/or 250.

Computer system 1200 has a case 1202, enclosing a main board 1204. The main board 1204 has a system bus 1206, connection ports 1208, a processing unit, such as Central Processing Unit (CPU) 1210 with at least one macro processor (not shown) and a memory storage device, such as main memory 1212, hard drive 1214 and CD/DVD ROM drive 1216.

Memory bus 1218 couples main memory 1212 to the CPU 1210. A system bus 1206 couples the hard disc drive 1214, CD/DVD ROM drive 1216 and connection ports 1208 to the CPU 1210. Multiple input devices may be provided, such as, for example, a mouse 1220 and keyboard 1222. Multiple output devices may also be provided, such as, for example, a video monitor 1224 and a printer (not shown).

Computer system 1200 may be a commercially available system, such as a desktop workstation unit provided by IBM, Dell Computers, Apple, or other computer system provider. Computer system 1200 may also be a networked computer system, wherein memory storage components such as hard drive 1214, additional CPUs 1210 and output devices such as printers are provided by physically separate computer systems commonly connected together in the network. Those skilled in the art will understand and appreciate that the physical composition of components and component interconnections are comprised by the computer system 1200, and select a computer system 1200 suitable for the establishing a controller 118, the first system 126, or other component of CBRSS 100.

When computer system 1200 is activated, preferably an operating system 1226 will load into main memory 1212 as part of the boot strap startup sequence and ready the computer system 1200 for operation. At the simplest level, and in the most general sense, the tasks of an operating system fall into specific categories, such as, process management, device management (including application and user interface management) and memory management, for example.

In such a computer system 1200, and with specific reference to the controller 118, the first system 126, or other adapted computer—for each system each CPU is operable to perform one or more of the methods or portions of the methods as associated with each device for establishing CBRSS 100 as described above. The form of the computer-readable medium 1228 and language of the program 1230 are understood to be appropriate for and functionally cooperate with the computer system 1200. In at least one embodiment, the computer system 1200 comprising at least a portion of the library 102 is a SpectraLogic nTier 700, manufactured by Spectra Logic Corp., of Boulder Colo.

Embodiments of the present invention can be performed an nTier 700 with computing functions such as by the computer system 1200 of FIG. 12. As discussed above, standard procedure for storing files sequentially to tape employs a strategy of receiving a first file and storing that first file to a first tape, then receiving a second file and storing the second file in available space following the first file on the first tape and so on until the first tape is full. Once full, a second tape continues the same sequential storage routine until the second tape is full. This process is repeated until the tape library is full of sequentially written data. If a user of data wants a specific type of file, such as pictures, for example, the user of data will have to access a number of different tapes to recall those pictures assuming the pictures are on a number of different tapes. Instead of inefficiently accessing a number of different tapes to recall those pictures, which are dispersed over a number of tapes, certain embodiments consistent with the present invention employ grouping the pictures on one or a select family of tapes, thus providing a more efficient way to access the pictures. For example, certain embodiments consistent with the present invention contemplate an nTier 700 requesting meta data associated with a file (intended to be stored therein) prior to receiving the file. Because the meta data possesses a number of parameters, such as text, picture, drawing, date, author, client, etc., the file can be grouped based on one or more of the parameters. In other words, if the file is a picture it can be grouped to one or more tapes that are used to store pictures. Accordingly, drawing files may be grouped to a tape or tapes used for storing drawing files but not picture files, for example. In this way, picture files can be sent first (possibly out of order from an initial roster of assorted files presented to the nTier 700) and drawing files sent after the picture files to improve storing efficiency. In other words, all picture files are sent first to be stored a tape or tapes grouped for picture files and then all drawing files are sent after the picture files to be saved on a tape or tapes grouped for drawing files. In a different embodiment, the user of data, (or host, or client) may send a plurality of files (for storage) to the nTier 700 which buffers the files (on a disk drive or flash memory) and then sorts the files based on one or more common parameters associated with each file before storing the files on one or more tapes. In either embodiment, the nTier 700 receives metadata associated with files or streams of data. Files that are in common based on the grouping of common parameters can be saved to a common tape cartridge or group of common tape cartridges. In this way, for example, all picture files are saved to one or more tapes grouped for picture files, text files are saved to a different/independent group of one or more tapes grouped for text files, etc. The parameters can be associated with data blocks, streams of data or files, just to name several examples. As mentioned earlier, the groups can be identified by individual users of data, e.g., all files from a first user of data can be assigned to a first particular tape or group of tapes and a second user of data can be assigned to a second particular tape or group of tapes.

It is to be understood that changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method comprising:
   receiving, via a processor, a random stream of data objects, each data object including a respective identifiable element defining a type of data object addressing a respective predefined directory path;
   based on the identifiable elements of the received data objects, ordering, via the processor, the data objects in the random stream by organizing a first plurality of a first type of data object addressing a selected predefined directory path into a first organized group; and organizing a second plurality of a second type of data object also addressing the selected predefined directory into a different second organized group; and
   directing, via the processor, in the same removable data storage element among a plurality of removable data storage elements to store the first organized group with the second organized group linearly.

2. The method of claim 1, wherein the directing is performed at least in part by a removable media library.

3. A removable media storage system, comprising:
   a removable media library having a plurality of removable data storage elements structured and arranged for linear data access;
   a library controller comprising one or more processor and memory, and to perform the steps of:
   to receive a request to store a random stream of different types of data objects, each data object including an identifiable element defining the type of data object and addressing a respective directory path;
   based on the identifiable elements of the received data objects, to order the data objects in the random stream by organizing a first plurality of a first type of data object addressing a selected directory path into a first organized group and to organize a second plurality of a second type of data object also addressing the selected directory path into a second organized group; and
   to store in the same removable data storage element the first organized group with the second organized group linearly.

4. The system of claim 3, wherein the library controller adapted to direct the operation of the removable media library and respond to write and read requests from a plurality of users.

* * * * *